United States Patent [19]

Fosco, Jr.

[11] Patent Number: 4,597,435
[45] Date of Patent: Jul. 1, 1986

[54] BOTTLE WARMER OR COOLER

[76] Inventor: Benjamin P. Fosco, Jr., 5461 N. Monitor St., Chicago, Ill. 60630

[21] Appl. No.: 690,115

[22] Filed: Jan. 9, 1985

[51] Int. Cl.⁴ ............................ F28F 9/22; F28F 9/24
[52] U.S. Cl. .................................. 165/80.5; 62/457; 126/261
[58] Field of Search ..................... 165/80 D; 126/261; 220/DIG. 6; 62/457

[56] References Cited

U.S. PATENT DOCUMENTS

| | | | |
|---|---|---|---|
| 1,329,426 | 2/1920 | Muckle | 165/80 D |
| 1,822,593 | 9/1931 | Johnson | 165/80 D |
| 2,137,676 | 11/1938 | Martin | 165/80 D |
| 2,895,718 | 7/1959 | Prather | 165/80 D |
| 3,402,763 | 9/1968 | Peterson | 165/80 D |
| 4,163,471 | 8/1979 | Leder | 165/80 D |

*Primary Examiner*—Lloyd L. King
*Attorney, Agent, or Firm*—Silverman, Cass & Singer

[57] ABSTRACT

A device for heating or cooling a baby bottle or similar article by heat exchange with a thermal transfer fluid includes a container for holding the bottle in contact with the fluid, preferably water from a conventional faucet. The bottle is held on a platform above the bottom of the container and the fluid is directed to flow upwardly through the platform against the bottle.

17 Claims, 4 Drawing Figures

U.S. Patent   Jul. 1, 1986   4,597,435
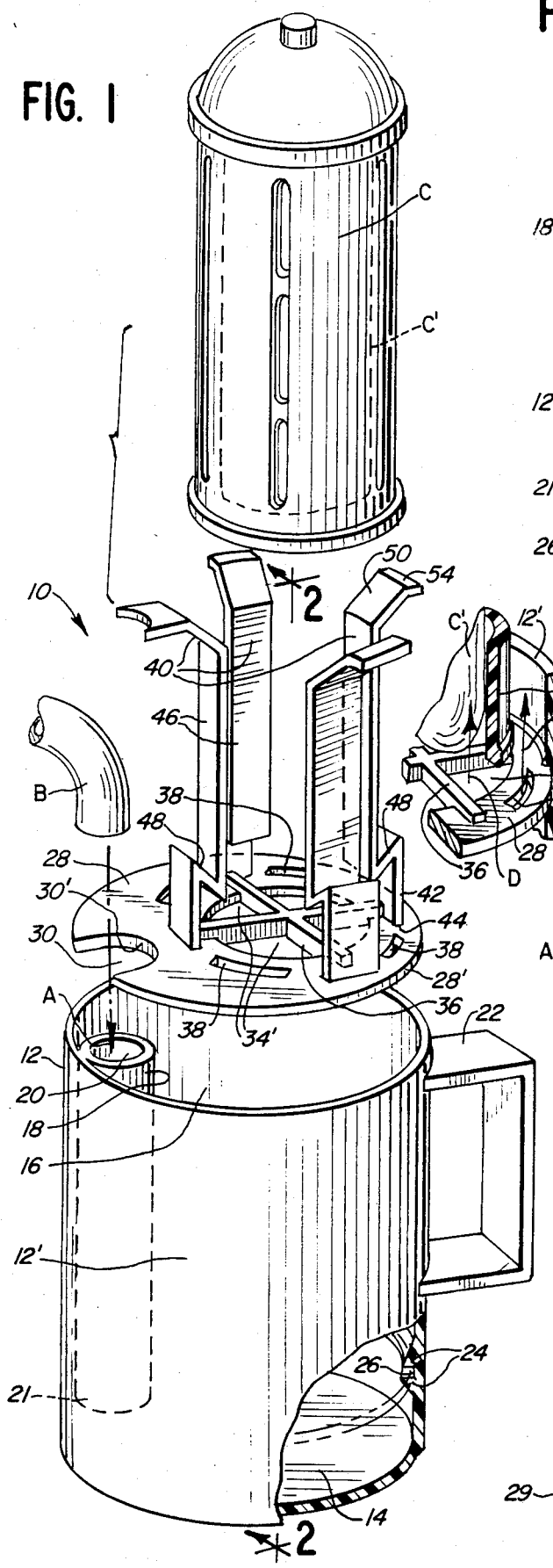
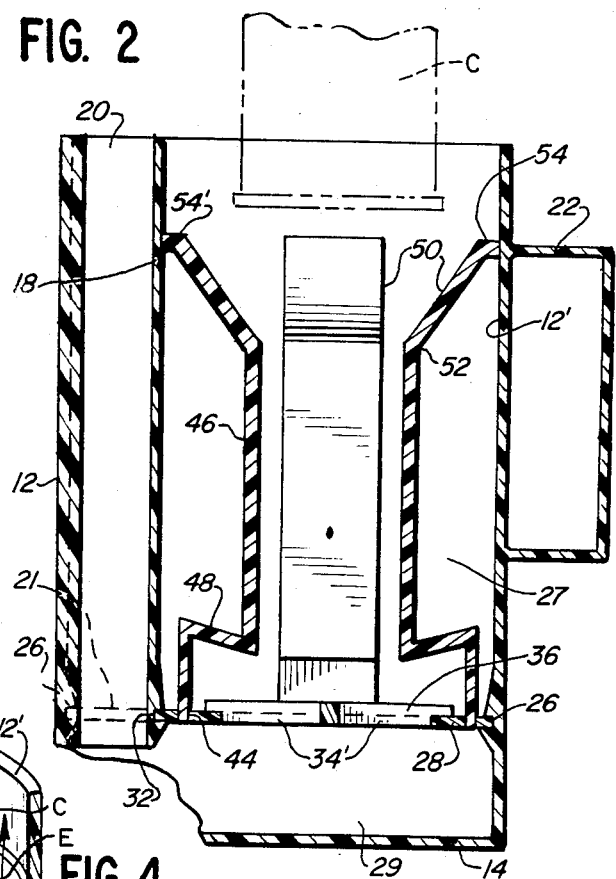
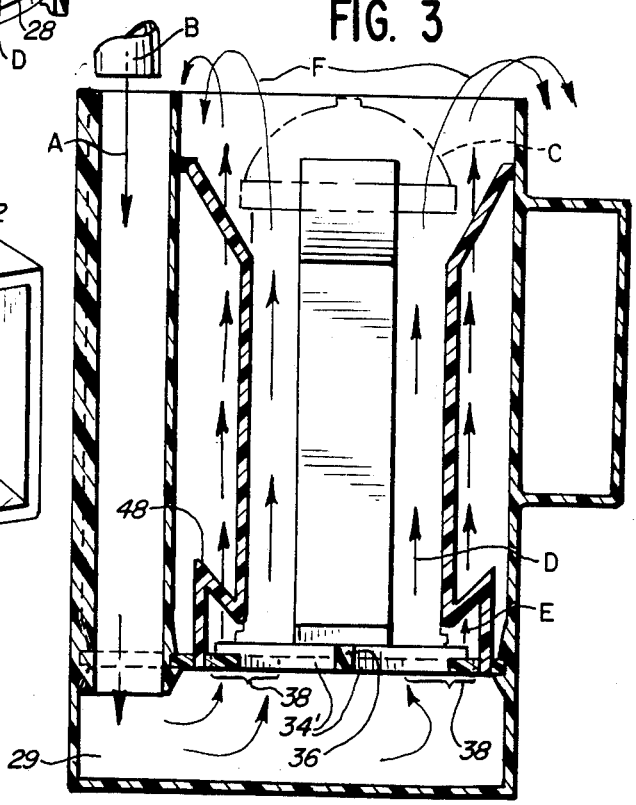

BOTTLE WARMER OR COOLER

BACKGROUND OF THE INVENTION

This invention relates to receptacle-type devices for use in heating or cooling baby feeding bottles, and more particularly, to a novel receptacle device which can utilize a thermal transfer fluid to provide the desired heating or cooling of the bottle.

Numerous receptacle-type devices have been developed for heating refrigerated milk, infant formula, and similar beverages, prior to serving. U.S. Pat. Nos. 820,829 and 1,785,438 describe feeding bottle heaters designed to reduce the time required to heat the bottle by employing a heat exchange fluid which is heated prior to filling the bottle heater. U.S. Pat. No. 2,137,676 describes a bottle heater in which hot automobile engine coolant is employed in upward flow through the heater. However, the efficiency of this bottle heater is reduced by the practical requirement that the hot, engine coolant is not allowed to directly contact the bottle and is separated there from by a heat-conducting wall of the heater device.

In an effort to employ hot tap water as a convenient heating fluid, U.S. Pat. No. 4,163,471 describes a bottle heater in which the tap water enters through the open top of a receptacle holding the bottle, and the tap water discharges through the bottom of the receptacle. The efficiency of this heater is reduced because the higher thermal energy of the water which enters through the top of the receptacle immediately is mixed with the remaining, entire body of water within the receptacle before it drains from the bottom of the receptacle. This contributes to a decreasing thermal energy gradient toward the device's bottom end.

U.S. Pat. No. 2,639,897 describes a bottle heater in which hot water enters through the bottom of the heater and is directed upwardly against a turbine which rotates the bottle support to provide forced circulation of the hot water before it discharges over the upper edge of the receptacle. This heater is reduced in efficiency because the hottest water inside the heater device never contacts the bottom of the bottle and is directed outwardly to the receptacle wall by the turbine.

None of the bottle heater devices taught in the prior art have enabled the economy, convenience and efficiency to be realized by employing hot water from a conventional tap or faucet which is impinged against the bottle along its length within the heater device upwardly thereby obtaining desired thermal heat exchange between such heated fluid and the fluid in the bottle.

SUMMARY OF INVENTION

A portable baby feeding bottle heating or cooling device which includes an elongate enclosure wall forming a container or holder for the bottle. Said container is open at its upper end for introducing the bottle with nutrient fluid thereinto for heating and/or cooling, as desired. The opposite bottom end of the container is closed and an internal platform is provided spaced above the closed end to divide the container into an upper chamber and a lower chamber. The platform is perforated to enable fluid communication between the chambers.

The feeding bottle is positioned on the platform in the container spaced circumferentially from the enclosure wall by retainer means, thereby providing a course for thermal transfer fluid to be circulated around the bottle for heat transfer purposes.

Means for introducing a thermal transfer fluid to the device comprises an elongate conduit, such as a tube supported on an interior circumferential surface of the enclosure wall and oriented parallel with the longituginal axis of the container. Said conduit or tube has one open end in proximity to the upper end of the container and an opposite open end communicating with said lower chamber. The thermal transfer fluid, such as hot or cold water, is introduced into the tube through said upper open end to flow into the lower chamber and continue upwardly through the perforated platform to course around the retained bottle in the upper chamber and thereafter, exit over the perimetric edge of the container in an overflow from the container. The thermal transfer fluid is available from an ordinary water tap or faucet to be introduced directly into the tube.

The platform preferably is formed with medial upstanding formations to form a so-called stage for supporting said bottle. The retainer means comprise brackets supported on the platform for holding the bottle in heat transfer position while the thermal transfer fluid courses upwardly surrounding the bottle in the upper chamber. The platform has additional passageways or apertures located to permit transfer fluid also to impinge against the bottom of the bottle.

The device embodying the invention is especially suitable for holding baby feeding bottles in which the nutrient fluid is stored in a plastic bag liner. The device is portable and effective for use in proximity to any suitable source of thermal transfer fluid, both indoors and outdoors.

BRIEF DESCRIPTION OF THE DRAWING

FIG. 1 is an exploded, perspective view, partially broken away, of the bottle heating or cooling device embodying the invention with feeding bottle poised to be installed therein;

FIG. 2 is a medial sectional view taken along line 2—2 of FIG. 1, albeit through the assembly of the device in FIG. 1 without the feeding bottle installed.

FIG. 3 is a sectional view similar to FIG. 2 but with the feeding bottle installed and illustrating the flow paths of the thermal transfer fluid introduced into the device from a conventional faucet.

FIG. 4 is a fragmentary perspective view with portions broken away from the lower end of the device in FIG. 3 to illustrate flow paths for thermal transfer fluid from the bottom chamber.

DETAILED DESCRIPTION OF THE PREFERRED EMBODIMENT

Referring to FIG. 1, an embodiment of the feeding bottle heating or cooling device according to this invention is designated generally by the reference character 10. The device 10 includes a generally cylindrical enclosure wall 12' defining a container 12 which holds an inserted bottle C. The device 10 is particularly efficient in heating or cooling bottles including a conventional plastic liner bag C' such as the Gerber$_R$ and Platex$_R$ bottles. The container 12 has a closed bottom wall 14 and an opening 16 at the upper end. A fluid supply tube 18 is attached or molded on the interior surface of the circumferential wall 12'. The tube 18 is oriented upright with upper and lower openings 20 and 21 respectively. The opening 20 at the upper end of the tube 18 is provided to enable either hot or cold water represented by arrow A from a conventional faucet B to enter the tube 18 as more fully described with reference to FIGS. 2 and 3. A handle 22 is attached or molded on the outer surface of the wall 12'. The container 12 and tube 18 can be fabricated from rigid plastic or other suitable material.

A short distance above the bottom wall 14, the circumferential wall 12' has a thickened section 24 to enable a circumferential slot 26 to be formed on the interior thereof. A generally circular platform 28 is mounted within the container 12 so that the peripheral edge 28' will press fit into the groove 26 which positions and supports the platform 28. The platform 28 has an aperture 30 which interrupts the peripheral edge 28'. The edge 30' of the aperture 30 generally conforms to the curvature in the exterior surface of the tube 18. The edge 30' is press fit into a groove 32 formed on exterior surface of tube 18, similar to the groove 26 as best shown in FIG. 2.

Referring to FIG. 2, the platform 28 divides the interior of the container 12 into an upper chamber 27 for holding the bottle C and a lower chamber 29 for distribution of the fluid below the bottle C prior to its upward flow in contact with the bottle. The tube 18 projects downwardly through the aperture 30 so that the fluid supplied through the tube 18 is discharged from the opening 21 into the distribution chamber 29 as illustrated in FIG. 3.

Referring again to FIG. 1, the platform 23 has a large, circular hole 34, and a raised stage 36 having a cruciform shape is formed across the hole 34 generally concentric therewith. The stage 36 divides the hole 34 into four quadrants 34'. The stage 36 also supports the bottle C at a slightly elevated position relative to the platform 28.

As best shown in FIGS. 3 and 4, the thermal transfer fluid can flow upwardly through the quadrants 34', as indicated by the arrows D, directly against and around the bottom of the liner bag C' containing the infrant formula or the like within the bottle C. The fluid then flows upwardly to overflow from the opening 16, as indicated by arrows F, into a sink (not shown).

A bottle having a solid bottom (not shown), and without a liner, can also be supported on the stage 36 with similar alignment and exposure to the upward fluid flow through the quadrants 34'.

The platform also has four arcuate slots 38 which are arranged in a circular pattern around and concentric with the quadrants 34'. The slots 38 are located to provide a generally annular flow pattern of the fluid through the slots 38, as indicated in FIGS. 3 and 4 by arrows E, directed upwardly in contact with the upstanding outer surface of the bottle C.

The numbers and configuration of the slots 38 can be modified for a desired variation in the fluid flow pattern therethrough. In the illustrated embodiment, the combined cross-sectional area of the slots 38 is smaller than the combined cross-sectional area of the quadrants 34' in order to provide for a larger volumetric fluid flow rate through the centrally located quadrants 34'. The larger flow rate through the quadrants 34' reduces diversion of the flow along the container wall 12' and promotes flow in contact with the bottle C, particularly the liner C'.

Referring again to FIG. 1, the device 10 includes four upstanding, jointed brackets 40 whose bottom ends 42 are held in slots 44 formed in platform 28. Each bracket 40 includes a medial portion 46 which engages and holds the inserted bottle C on the stage 36 in a position centered above the quadrants 34'. The brackets 40 are fabricated from flexible plastic or light metal. Each bracket 40 also includes an N-shaped, double angled portion 48 which can resiliently compress to allow outward displacement of the medial portion 46 when the bottle is inserted between the brackets 40. The upper portion of each bracket is an outwardly projecting portion 50 which joins the medial portion 46 at a flexible joint 52. The portions 50 cooperate to provide funnel-like guidance for insertion of the bottle C.

The upper ends 54 of three of the bracket portions 50 are slightly arcuately shaped to slidably engage the interior surface of the container wall 12'. The end 54' of the fourth bracket similarly conforms to and slidably engages the curvature of the outer surface of the tube 18. The ends 54 and 54' slide upward to permit slight rotation of the portions 50 upon joints 52 when the bottle C is inserted displacing the medial portion 46.

Variations in the size, structural features, and material of the cooperating parts may occur to the skilled artisan without departing from the scope of the invention which is set forth in the claims hereto appended.

I claim:

1. A portable device for selectively heating or cooling a bottle by heat exchange with a fluid, comprising:
   A. a container for holding said bottle in contact with said fluid, said container having an enclosing wall upstanding from a closed bottom end thereof and having an open, upper end thereof;
   B. a platform means positioned within said container above said bottom end for supporting the bottle in spaced relation thereto, said platform means dividing the interior of the container into an upper chamber for holding said bottle and a lower chamber between said platform means and said bottom end for distribution of said fluid, said platform means having at least one passageway oriented upwardly therethrough for directing upward passage of said fluid from said lower chamber into said upper chamber to contact said bottle during upward flow of the fluid through the container; and
   C. a conduit means communicating with said lower chamber and defining a flow path separated from said upper chamber for supplying said fluid to said lower chamber, said conduit means including an upstanding tube positioned within said container, said tube having an opening formed at the upper end thereof for entry of fluid downwardly flowing through said tube into said lower chamber.

2. The device of claim 1 in which said tube extends downwardly within said upper chamber and through an aperture formed in said platform means, said tube having an outlet formed at the lower end thereof communicating with said lower chamber for discharge of said fluid therein.

3. The device of claim 1 in which said platform means includes support means for said bottle, said support means being aligned with said passageway for direction of said upwardly flowing fluid therethrough against the bottom of said bottle.

4. The device of claim 3 in which said passageway is defined by a generally circular hole, said support means including a cruciform-configured stage positioned diagmetrically across said hole, said stage having a portion thereof elevated from the upper surface of said platform for supporting the bottom of said bottle thereabove.

5. The device as claimed in claim 1, further including guide means for holding said bottle in alignment with said passageway.

6. The device of claim 5, in which said guide means includes a plurality of brackets positioned within said upper chamber for engagement with an upstanding surface of the bottle.

7. The device of claim 6 in which each said bracket includes a bottom end secured to said platform means.

8. The device of claim 6 in which at least one said bracket includes an upstanding member positioned inwardly from displaceable outwardly toward said wall when said bottle is inserted into said container.

9. The device as claimed in claim 8 in which said bracket includes an N-shaped portion being resiliently formed for compression of said N-shape during said outward displacement.

10. The device of claim 8 in which at least one of said brackets includes an upper end thereof slidably engaged with the interior surface of said wall to enable upward sliding of said end during said outward displacement.

11. The device of claim 1 further including a plurality of brackets positioned within said upper chamber for engagement with an upstanding surface of the bottle, wherein one of said brackets includes an upper end thereof slidably engaged with the exterior surface of said tube.

12. The device of claim 1 in which said platform means is removably secured within a circumferential slot form in the interior surface of said wall.

13. The device of claim 3 in which said platform means has at least a second passageway oriented upwardly therethrough and spaced from said first mentioned passageway for directing upward passage of said fluid against an upstanding surface of said bottle.

14. A portable device for selectively heating or cooling a bottle by heat exchange with a fluid, comprising:

A. a container for holding said bottle in contact with said fluid, said container having an enclosing wall upstanding from a closed bottom end thereof and having an open, upper end thereof;

B. a platform means positioned within said container above said bottom end for supporting the bottle in spaced relation thereto, said platform means dividing the interior of the container into an upper chamber for holding said bottle and a lower chamber between said platform means and said bottom end for distribution of said fluid, said platform means having at least one passageway oriented upwardly therethrough for directing upward passage of said fluid from said lower chamber into said upper chamber to contact said bottle during upward flow of the fluid through the container;

C. a conduit means communicating with said lower chamber and defining a flow path separated from said upper chamber for supplying said fluid to said lower chamber; and D. at least one guide bracket positioned within said upper chamber for engagement with an upstanding surface of the bottle, said bracket including a member positioned inwardly from the interior surface of said enclosing wall and resiliently displaceable outwardly toward said wall when said bottle is inserted into said container.

15. The device of claim 14 in which said bracket includes a bottom end secured to said platform means.

16. The device as claimed in claim 14 in which said bracket includes an N-shaped portion being resiliently formed for compression of said N-shape during said outward displacement.

17. The device of claim 14 in which said bracket includes an upper end thereof slidably engaged with the interior surface of said wall to enable upward sliding of said end during said outward displacement.

* * * * *